(12) United States Patent
Timperi et al.

(10) Patent No.: US 7,798,297 B1
(45) Date of Patent: Sep. 21, 2010

(54) HANDHELD APPARATUS AND MOTION DAMPENER FOR THE SAME

(75) Inventors: Mikko Timperi, Raisio (FI); Jyri Kaija, Somero (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/459,377

(22) Filed: Jun. 30, 2009

(51) Int. Cl.
*F16D 57/00* (2006.01)

(52) U.S. Cl. ...................................... 188/290

(58) Field of Classification Search ......... 188/290–293, 188/296; 16/50
See application file for complete search history.

(56) References Cited

U.S. PATENT DOCUMENTS

| | | | | |
|---|---|---|---|---|
| 2001/0017247 A1* | 8/2001 | Machida | ...................... | 188/290 |
| 2003/0075404 A1* | 4/2003 | Takahashi | .................... | 188/290 |
| 2004/0099495 A1 | 5/2004 | Hayashi | ...................... | 188/290 |
| 2004/0261220 A1 | 12/2004 | Lowry | ............................ | 16/50 |
| 2006/0169555 A1* | 8/2006 | Doornbos | .................... | 188/290 |
| 2008/0118057 A1 | 5/2008 | Son et al. | ............... | 379/433.01 |

FOREIGN PATENT DOCUMENTS

| | | |
|---|---|---|
| JP | 10051526 A | 2/1998 |
| JP | 2003065320 A | 3/2003 |

* cited by examiner

*Primary Examiner*—Christopher P Schwartz
(74) *Attorney, Agent, or Firm*—Harrington & Smith (57) ABSTRACT

An apparatus having in a mutually rotatable configuration, a first fluid shear member connectable to a first moveable body part of a handheld device and a second fluid shear member connectable to a second moveable body part of the handheld device. The first and second fluid shear members are configured to experience mutual rotation when the first and second moveable body parts are connected respectively to the first and second fluid shear members and when the moveable body parts are moved in relation to one another. The first and second fluid shear members are matched and there is fluid between the first and second fluid shear members so as to invoke viscous dampening when the first and second fluid shear members rotate in relation to one another.

15 Claims, 6 Drawing Sheets

HANDHELD APPARATUS AND MOTION DAMPENER FOR THE SAME

TECHNICAL FIELD

The present invention generally relates to handheld apparatus. The invention relates in particular, though not exclusively, to a portable apparatus with moveable parts and a motion dampener configured to absorb kinetic energy when moving the moveable parts in relation to each other.

BACKGROUND

Various portable devices are provided with two or more parts that are moveable in relation to each other. Depending on the size of the device, the length of a movement and the mass of moving parts, substantial strain may be applied to the mechanism that keeps the parts movably together. There are various technical solutions such as using snug fitting or friction hinging hinged parts, moving a clamp along an axle, rotating a fan with a geared-up speed and squeezing viscous or hydraulic fluid through tight gaps so as to absorb kinetic energy into heat that is dissipated out of the device. However, portable devices such as clam shell formed mobile telephones present a particularly difficult environment in which the known techniques suffer from a number of drawbacks. The dampening mechanisms in such devices are typically inadequately dampening, noisy, fragile, heavy, bulky, complex i.e. difficult to manufacture and prone to malfunction. Hence, reasonably small mechanisms tend to be either expensive or to have too short a life time to endure the harsh operating environment. Namely, mobile phones are often exposed to dropping on a floor in cold and hot environments, squeezing in pocket, use as stress toys and so on. While the manufacturers of mobile phones can guide how to properly use mobile phones and protect them from damage by careful operation and storage, the users often take shortcuts or simply do not bother to avoid malfunction. Yet, when problems arise, the manufacturers are usually asked to repair any faults on their account.

SUMMARY

According to a first example aspect of the invention there is provided an apparatus comprising:
  in a mutually rotatable configuration, a first fluid shear member connectable to a first moveable body part of a handheld device and a second fluid shear member connectable to a second moveable body part of the handheld device, the first and second fluid shear members being configured to experience mutual rotation when the first and second moveable body parts are connected respectively to the first and second fluid shear members and when the moveable body parts are moved in relation to one another;
  the first and second fluid shear members being matched; and
  fluid between the first and second fluid shear members.

The first and second fluid shear members may be matched so that they have keyed forms.

The first fluid shear member may comprise a first cylindrical element.

The second fluid shear member may comprise a second cylindrical element.

The first fluid shear member may further comprise a third cylindrical element coaxially with and inside the first cylindrical element. The third cylindrical element may comprise protruding parts that extend over a first length in the radial direction and over a second length in the axial direction.

The first and third cylindrical elements may be configured to sandwich the second cylindrical element.

The first fluid shear member may comprise a first end in the axial direction and an opposite end. The opposite end may be open to receive the second cylindrical element between the first and third cylindrical elements. The first end may be configured to fix the first and third cylindrical elements together.

The third cylindrical element may define a first axial passage for receiving an axle. The first axial passage may be configured to lock the axle to the third cylindrical element such that the rotation of the axle causes the third cylindrical element to rotate to a particular extent. The particular extent may refer to substantially identical angular motion. Alternatively, the particular extent may refer to a particular angular range.

The second fluid shear member may define a second axial passage to receive and pass through the axle.

The second fluid shear member may comprise a form locking part and the case may comprise a form locking counterpart configured rotationally lock the second fluid shear member to the case. The second fluid shear member may comprise, in axial direction of the axle, the form locking part and the second cylindrical element as a sequence.

The apparatus may further comprise a case configured to surround the first and second fluid shear members. The case may comprise a first end configured to cover the first cylindrical element while allowing the first cylindrical element rotate within the case. The case may be configured to form at the first end an inner surface that matches with an external surface of the first cylindrical element over a contact length in the axial direction. The contact length may correspond to the second length.

The first and second fluid shear members may provide three different mutually contacting cylinder surface interfaces configured to form shear force in the fluid. Moreover, the axle may also form with the second passage a fourth cylinder surface interface configured to form shear force in the fluid.

The apparatus may further comprise a follower configured to close the casing in an end opposite to the first end. The follower may be configured to lock to the axle such that rotational movement of the follower causes rotational movement of the axle to a given extent. The given extent may refer to substantially identical angular motion. Alternatively, the given extent may refer to a given angular range.

The apparatus may further comprise a spring configured to cause an angular resilient biasing force to resist rotational movement between the first and second fluid shear members. The spring may be connected between the follower and the second fluid shear member.

The apparatus may further comprise a biased cam configured to cause a rotational force between the first and second fluid shear members towards at least one predetermined angle between the first and second fluid shear members.

The cam may be biased by a resilient member. The resilient member may comprise a compression spring.

The apparatus may be a handheld apparatus. The handheld apparatus may comprise the first and second moveable body parts. The first and second moveable body parts may be rotatable in relation to one another. Alternatively, or additionally, the first and second moveable body parts may be moveable in relation to each other along a track that is selected from the following: linear track and curved track. The handheld apparatus may comprise a gear configured to translate mutual motion of the moveable body parts into mutually rotational motion of the first and second fluid shear members.

The handheld apparatus may be a mobile telephone.

According to a second exemplary aspect there is provided method comprising:

receiving force from mutual movement between two mutually moveable body parts of a handheld device and correspondingly causing mutual rotational movement between a first fluid shear member and a second fluid shear member;

shearing viscous fluid between the first fluid shear member and the second fluid shear member in a plurality of coaxial layers, the layers being axially overlapping.

According to a third exemplary aspect there is provided an apparatus comprising:

in a mutually rotatable configuration, first fluid shear means connectable to first moveable body part means of a handheld device and second fluid shear means connectable to second moveable body part means of a handheld device, the first and second fluid shear means being configured to experience mutual rotation when the first and second moveable body part means are connected respectively to the first and second fluid shear means and when the moveable body part means are moved in relation to one another;

the first and second fluid shear means being matched; and fluid means between the first and second fluid shear means.

Different non-binding exemplary aspects and embodiments of the present invention have been illustrated in the foregoing. Some embodiments may be presented only with reference to certain exemplary aspects of the invention. It should be appreciated that corresponding embodiments may apply to other exemplary aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
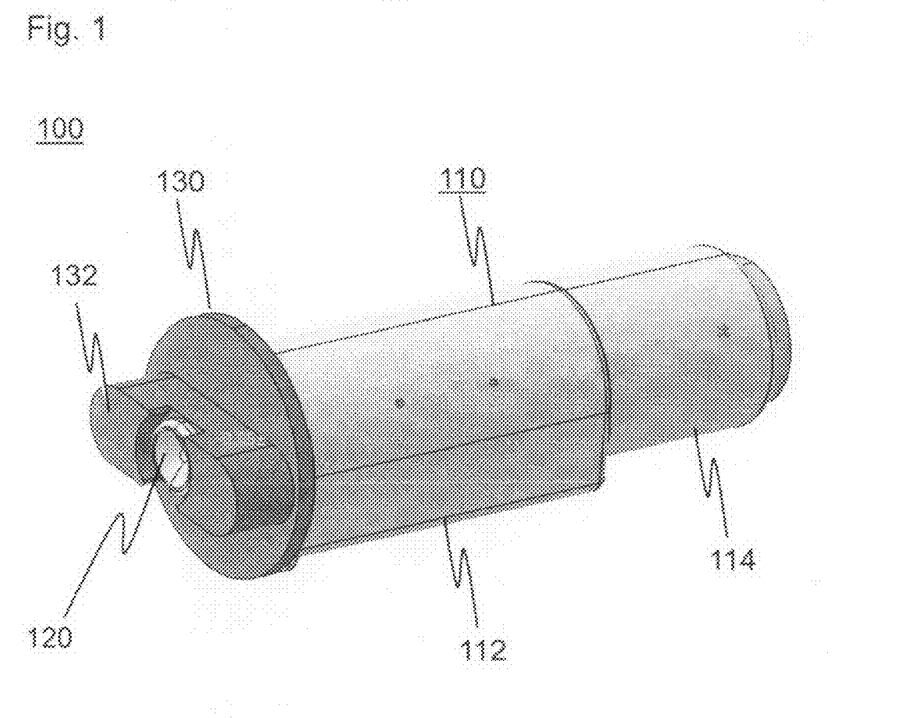
FIG. 1 presents three-dimensional illustration of a dampening device of an example embodiment of the invention.
Figure 2:
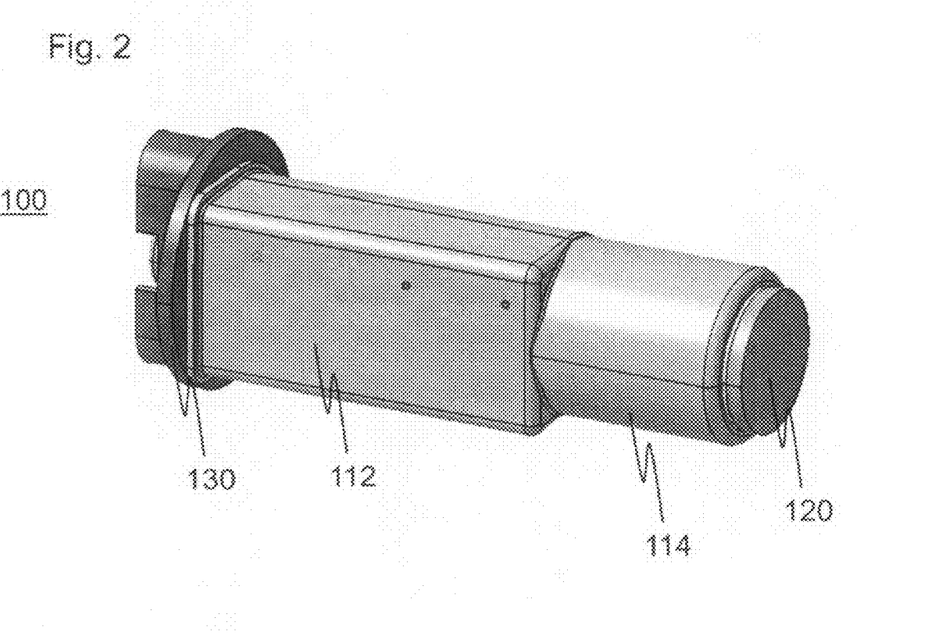
FIG. 2 presents another three-dimensional illustration of the dampening device of FIG. 1.

FIGS. 1 and 2 present three-dimensional illustrations of a dampening device 100 of an example embodiment of the invention. The dampening device may be constructed as a compact unit with main dimensions of just 5.5×20 mm in one embodiment. However, it is appreciated that the dimensions may be adapted according to particular construction and intended use of the dampening device. The dampening device 100 may be particularly suitable for use in handheld devices such as mobile phones, especially like Nokia® N97 to dampen movement of moveable body parts so as to avoid inadvertent dropping of the handheld device.

The dampening device 100 comprises the following externally visible parts:

a case 100 with a fixing section 112 and with a cylinder section 114;

a shaft 120 that extends through the dampening device 100;

a follower 130 with an attaching part 132 (such as a form-locking shape; screwing plate; rivet attachment plate; gluing plate; or magnet).

It may help to understand the following description to presume that any space between adjacent cylindrical surfaces is filled with viscous dampening fluid such as grease so as to form a viscous force to absorb kinetic energy. The dampening fluid may be, for instance, special damping grease such as those provided by damping greases manufactured by Shin-etsu Chemical Industries, Ltd. of Japan.

Figure 3:
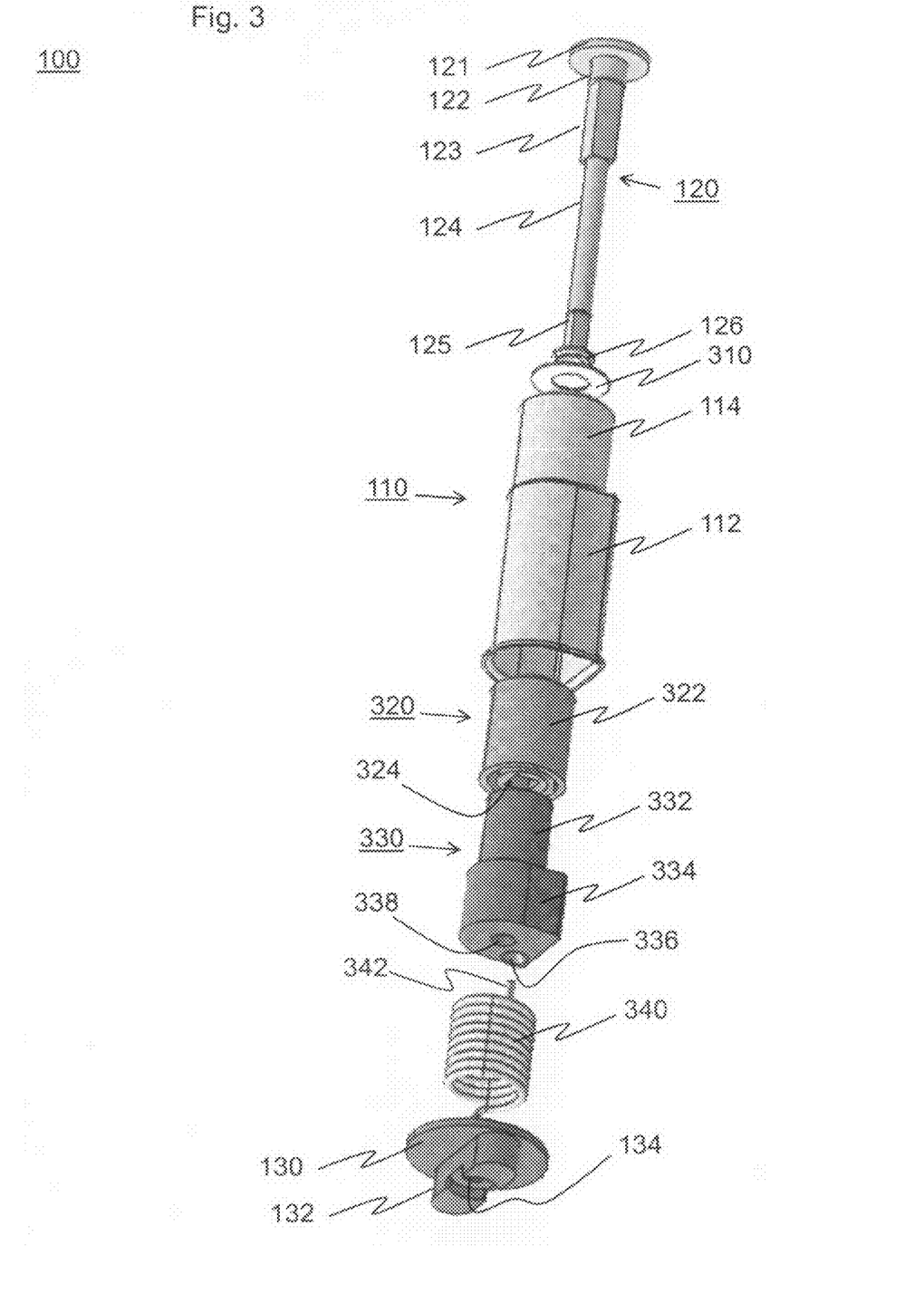
FIG. 3 presents a three dimensional assembly illustration of a dampening device according to an example embodiment of the invention.

FIG. 3 presents a three dimensional assembly illustration of a dampening device according to an example embodiment of the invention. FIG. 3 particularly illustrates interrelations of different parts of the dampening device 100. The shaft 120 has an endplate 121 and following the endplate, in succession a round sealing ring section 122 for receiving a sealing ring 310, a first rotation-inhibition section 123, a round axle section 124, a second rotation-inhibition section 125 and a head 126. FIG. 3 further shows the sealing ring 310 (e.g. a washer), the case 110 with the cylinder section 114 adjacent to the sealing ring 310, a first fluid shear member 320, a second fluid shear member 330, a torsion spring 340 and the follower 130.

The first and second fluid shear members 320 and 330 comprise a set of sandwiching cylinder sections which when assembled form a number of adhering pairs of surfaces out of which one is configured to be locked to the case and the other is configured to rotate along with the shaft 120.

The first fluid shear member 320 may enter into the cylinder section 114 of the case and lock with the shaft by the first rotation-inhibition section 123. In FIG. 3, the first rotation-inhibition section has a square profile and the first fluid shear member 320 has correspondingly channel 324. Thus, the first fluid shear member 320 is configured to rotate along with the shaft 120. The first fluid shear member has an outer surface 322 that is configured to adhere to the inner surface of the cylinder section 114 of the case 110.

Alternatively, the first rotation-inhibition section 123 may be configured to wedge with the channel 324 so as to inhibit or prevent undesired rotation of the shaft with relation to the channel 324.

The second fluid shear member 330 may comprise a cylinder 332 configured to enter into the first fluid shear member such that two closely adhering pairs of surfaces are formed with the first fluid shear member 320. The second fluid shear member further comprises a lock part 334 that is formed to form lock with the fixing section 112 of the case 110. The lock part 334 and the cylinder 332 together define an axel hole 338 for the axel section 124 coaxially with the first fluid shear member 320 and with the cylinder section 114. The lock part may further comprise a lock for the torsion spring 340 in order to support the torsion spring 340 to the case 110. Alternatively, the torsion spring 340 itself may be configured to abut to a suitably shaped part of the fixing section 112.

Next, there is drawn a helical spring as the torsion spring 340. It is appreciated, however, that the torsion spring may alternatively or additionally comprise a rotatable piece of flexible hose, of flexible grid, or any other type of resilient element suited to create a torsion bias. The torsion spring 340 is also an optional element that may be useful to allow automated motion in one direction (e.g. stiletto type opening of a clam shell type phone).

The follower 130 also defines a passage 134 for the shaft 120. The passage is formed to inhibit rotation of the second rotation-inhibition section of the shaft 120 from rotating within the passage 134. In FIG. 3, the second rotation-inhibition section is also of square profile. The aperture 134 may be of corresponding shape or made to conform to such a shape such that in normal use, the shaft 120 does not slip rotationally with relation to the passage.

The head 316 of the shaft is axially locked to the follower 130 when the dampening device 100 is assembled. This may be done in many ways, for instance by expanding the head e.g. by riveting as is shown in the head 316 of FIG. 3. It is appreciated that before assembly, the head 316 should pass through the apertures dimensioned for the following sections of the shaft 310. In one example, the shaft 310 is hollow at least at the end 316 such that after assembly, the end of the shaft is expanded in well-known techniques to prevent the assembly from opening unintentionally. It may also be useful to close the assembly so that it is not easy to dissemble, at least without leaving trace, because the operation of the dampening device may largely depend on the quality of the fluid inside the dampening device.

Figure 4:
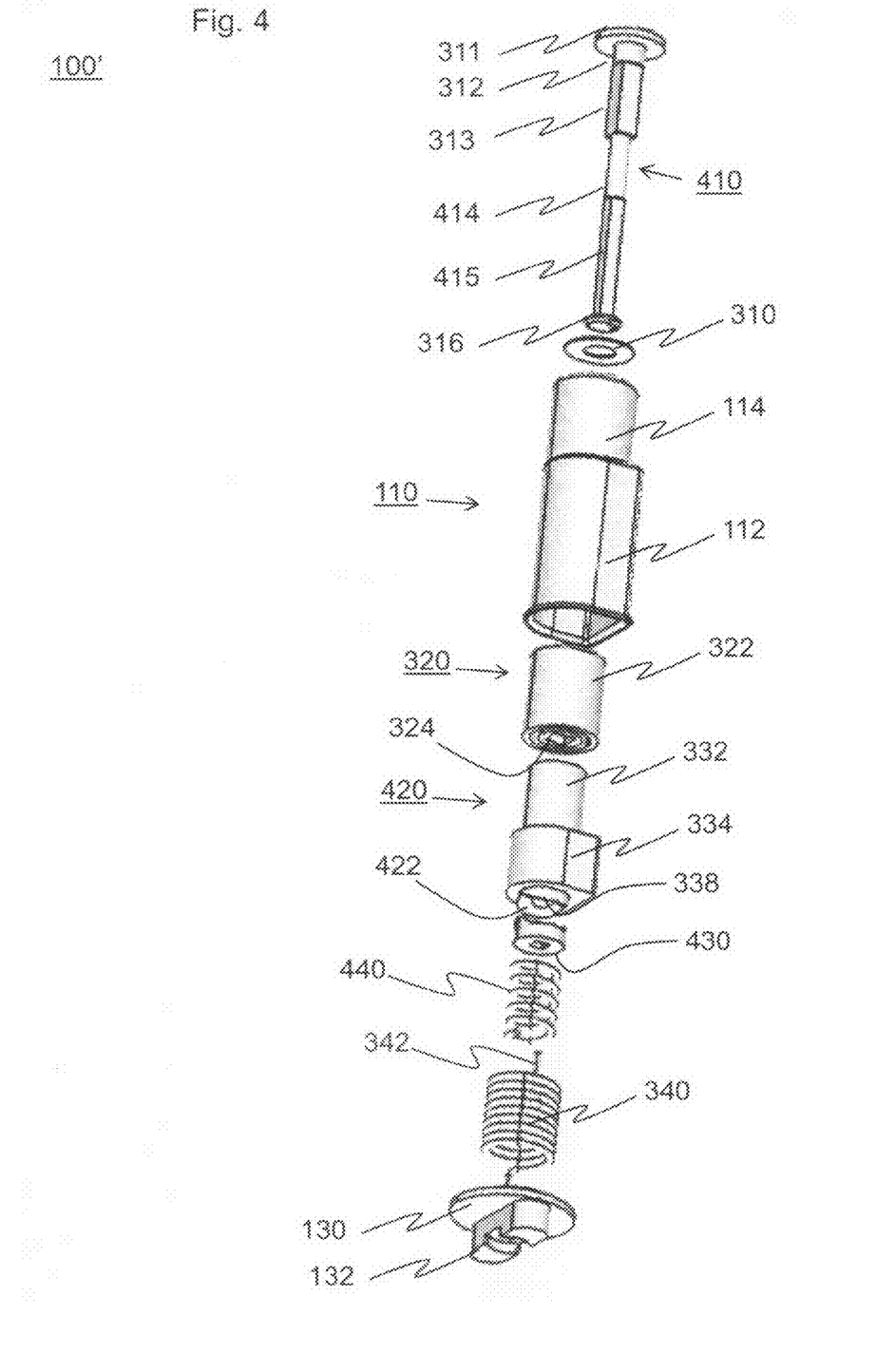
FIG. 4 presents a three dimensional assembly illustration of a dampening device according to another embodiment of the invention.

FIG. 4 presents a three dimensional assembly illustration of a dampening device according to another embodiment of the invention. In comparison to FIG. 3, FIG. 4 differs mainly in that FIG. 4 further shows a compression spring 440, an upper cam 430 rotationally locked to a shaft 410 and a lower cam 422 attached to the second fluid shear member, here denoted with reference sign 420. Also the shaft has a shorter axle section 414 than that (314) in FIG. 3 and a longer second rotation-inhibition section 415 than that (315) in FIG. 3, but otherwise the structures are similar.

The cam structure of FIG. 4 may provide a desired snap-effect. It is understood that the cam may comprise only one noose and desired number of recesses at predetermined angular positions to attract the shaft to assume corresponding angular positions. The cam may also be used to keep movable body parts closed together for transport as well as to keep the movable body parts in desired extended configuration (possibly in one of many alternatives).

Figure 5:
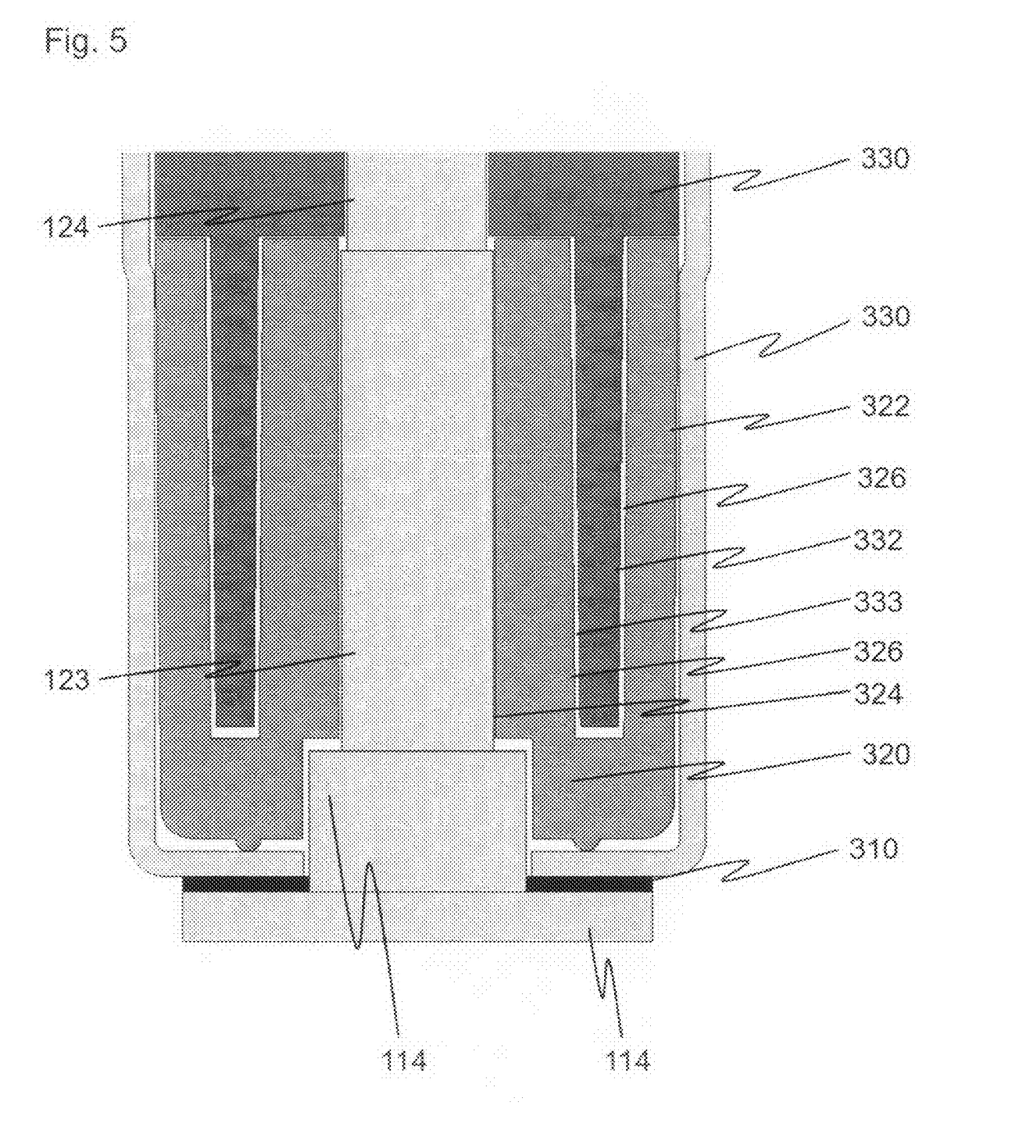
FIG. 5 presents a cross-section of a detail of a dampening device of FIGS. 3 and 4, when assembled.

FIG. 5 presents a cross-section of a detail of the dampening device 100 of FIGS. 3 and 4, when assembled. FIG. 5 shows particularly how the first and second fluid shear members are keyed or matched to closely follow one another so that a number of adjacent, very close pairs of rotating and fixed cylindrical surfaces are formed. When looking into the structure, layer-by-layer, there is the inner surface of the cylinder section 114 against the outer surface of the first fluid shear element, then the inner surface of that same cylindrical part against outer surface of the second fluid shear member and so forth.

FIG. 5 also clearly illustrates that viscous fluid is exposed to shear forces over a significant surface area (between each cylindrical surface pair and between the innermost cylinder surface and round axel section). Hence, the dampening device may provide relatively high extent of dampening in comparison to the size and weight of the dampening device.

FIG. 5 also presents that there may be minute spaces left on the bottom of the cylinder section in order to reserve some extra fluid. In some embodiments, the cylindrical elements may be produced so that their thickness varies angularly such that the inducing viscous dampening varies as a function of the angular relationship between the first and second dampening members. Moreover, there are various other ways to adapt the structure to particular needs with differing design of the fluid shear members' geometry, not to mention other parameters. For instance, instead of continuous cylindrical surfaces, there may be a set of teeth in one fluid shear member positioned to pass very near teeth or cylindrical surfaces of another fluid shear member; cylinders may have voids in the walls; there may be radial, axial or helical borings to increase the amount of viscous fluid that is exposed to shear.

Figure 6:
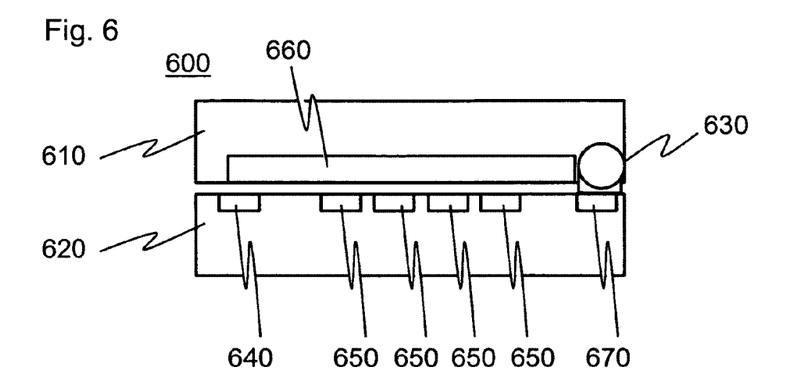
FIG. 6 presents a schematic drawing of a hand-held device according to an embodiment of the invention, seen as a section from a side.

FIG. 6 presents a schematic drawing of a hand-held device 600 according to an embodiment of the invention, seen as a section from a side. The hand-held device may be, for instance, a mobile phone, navigator, game device, personal digital assistant, electronic book. The hand-held device 600 comprises a first body part 610, a second body part 620, a hinge system 630 configured to rotatably connect the first and second body parts together, a microphone 640, a set of keys 650, a display 660 and a speaker 670.

Figure 7:
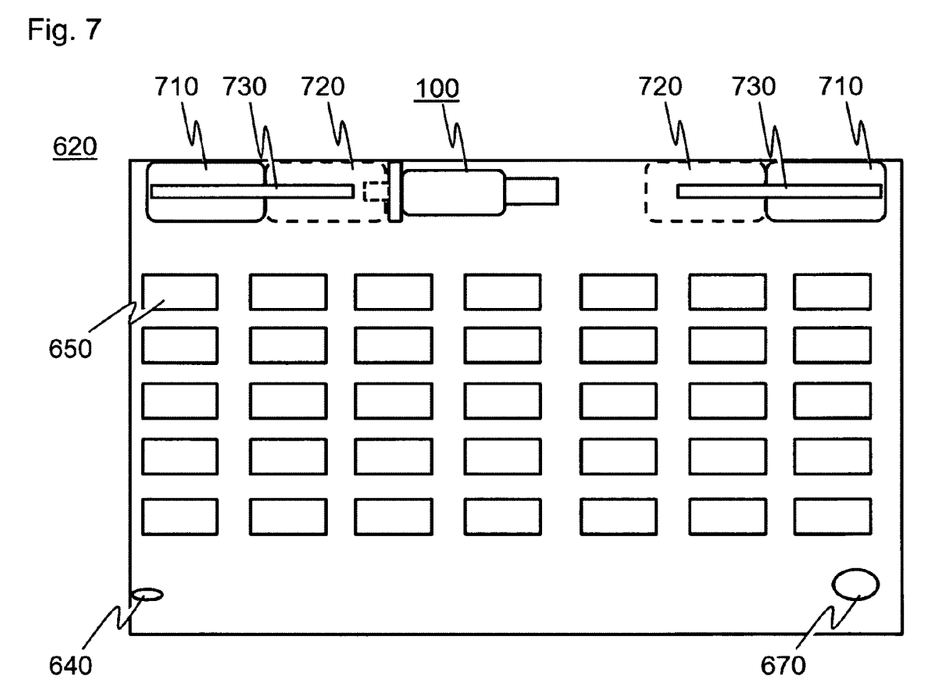
FIG. 7 presents a schematic drawing of one body part of the hand-held device of FIG. 6, seen from top.

FIG. 7 presents a schematic drawing of the first body part of the hand-held device of FIG. 6, seen from top. FIG. 7 particularly demonstrates an example of the hinge structure with two hinges and the dampening device 100 in connection with one of the hinges. FIG. 7 shows hinge axels 730 rotatably connecting hinge parts 710 and 720 of the first and second body part, respectively. The second hinge part 720 has also a matching recess for receiving the attaching part 132 of the follower 130 of the dampening device 100.

It is appreciated that it is also possible to construe the hinge structure such that a single hinge is surrounded by two dampening devices 100 or that a number of hinges may be provided with a dampening device. Moreover, the dampening device and the hinge may be further integrated e.g. such that a common axel provides the hinge axle and acts as a part of the shaft of the dampening device.

Figure 8:
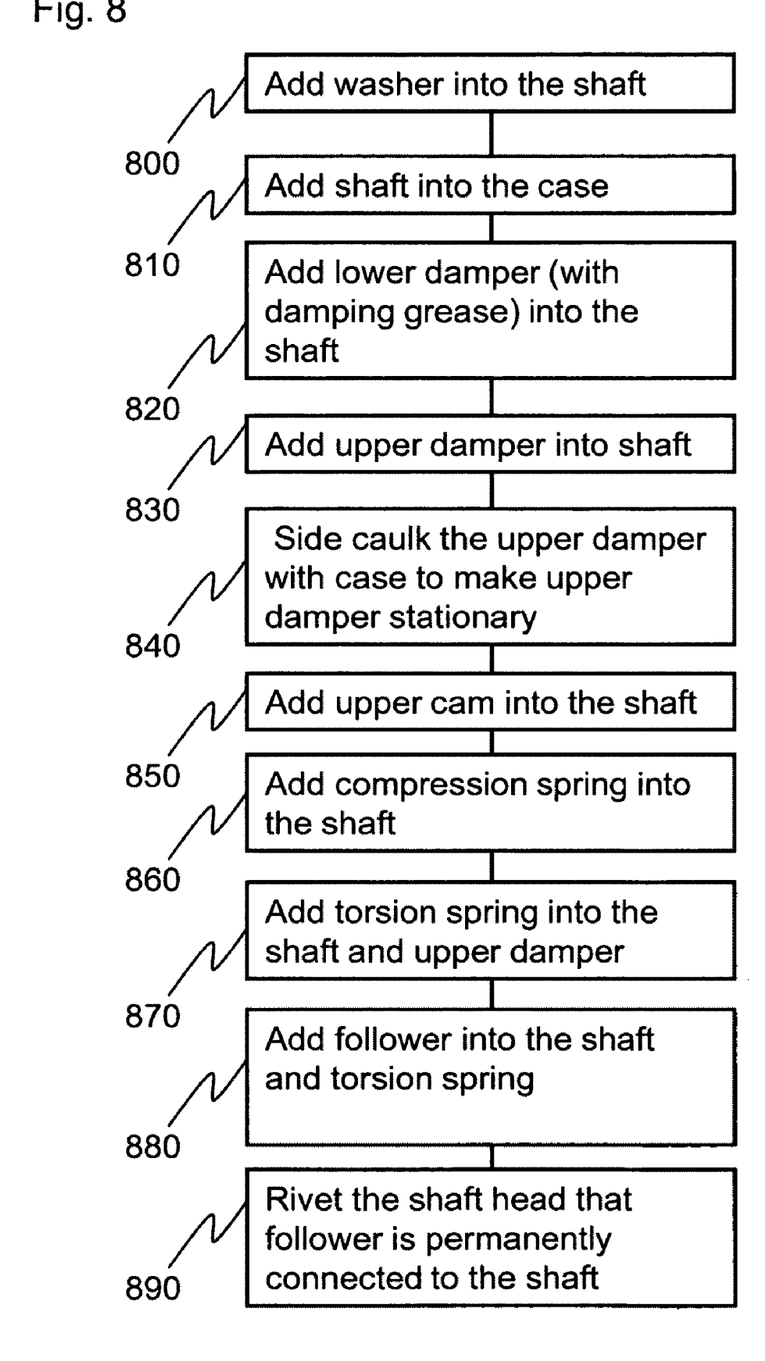
FIG. 8 presents a flow chart of a method according to an example embodiment of the invention.

FIG. 8 presents a flow chart of a method according to an example embodiment of the invention for assembling a dampening device 100'. It is appreciated that the process represents but one working solution, while others do also exist.

The assembly process comprises the following steps:

810. Add a washer into the shaft.

820. Add the shaft into the case.

830. Add lower damper or first fluid shear member (with damping grease) into the shaft

840. Add upper damper or the second fluid shear member into the shaft. Side caulk the upper damper with the case to make the upper damper stationary

850. Add upper cam into the shaft

860. Add compression spring into the shaft

870. Add torsion spring into the shaft and upper damper

880. Add follower into the shaft and torsion spring. Rivet the shaft head that follower is permanently connected to the shaft It is appreciated that the side caulking of the upper damper with the case may be very cost efficient in mass production, but it is also possible to form the upper damper such that it will not penetrate too deep into the case.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the scope and spirit of the appended patent claims.

We claim:

1. An apparatus comprising:
   in a mutually rotatable configuration, a first fluid shear member connectable to a first moveable body part of a handheld device and a second fluid shear member connectable to a second moveable body part of the handheld device, the first and second fluid shear members being configured to experience mutual rotation when the first and second moveable body parts are connected respectively to the first and second fluid shear members and when the moveable body parts are moved in relation to one another;
   the first and second fluid shear members being matched; and
   fluid between the first and second fluid shear members,
   wherein the first fluid shear member comprises a first cylindrical element,
   wherein the second fluid shear member comprises a second cylindrical element,
   wherein the first fluid shear member further comprises a third cylindrical element coaxially with and inside the first cylindrical element, and
   wherein the first and third cylindrical elements sandwich the second cylindrical element therebetween.

2. An apparatus according to claim 1, wherein the third cylindrical element defines a first axial passage for receiving an axle.

3. An apparatus according to claim 1, wherein the first axial passage is configured to lock the axle to the third cylindrical element such that the rotation of the axle causes the third cylindrical element to rotate to a particular extent.

4. An apparatus according to claim 1, wherein the second fluid shear member comprises a form locking part and a case of the apparatus comprises a form locking counterpart configured to rotationally lock the second fluid shear member to the case.

5. An apparatus according to claim 4, wherein the second fluid shear member comprises, in axial direction of the axle, the form locking part and the second cylindrical element as a sequence.

6. An apparatus according to claim 1, wherein:
   the first fluid shear member comprises a first end in the axial direction and an opposite end;
   the opposite end is open to receive the second cylindrical element between the first and third cylindrical elements; and
   the first end connects the first and third cylindrical elements together.

7. An apparatus according to claim 1, wherein the second fluid shear member defines a second axial passage to receive and pass through an axle.

8. An apparatus according to claim 1, wherein the apparatus further comprises a case configured to surround the first and second fluid shear members and configured to form an inner surface that matches with an external surface of the first cylindrical element over a given contact length in axial direction.

9. An apparatus according to claim 1, wherein the first and second fluid shear members are configured to provide at least three different mutually contacting cylinder surface interfaces configured to form shear force in the fluid.

10. An apparatus according to claim 1, wherein the apparatus further comprises a spring configured to cause an angular resilient biasing force to resist rotational movement between the first and second fluid shear members.

11. An apparatus according to claim 1, wherein the apparatus further comprises a biased cam configured to cause a rotational force between the first and second fluid shear members towards at least one predetermined angle between the first and second fluid shear members.

12. An apparatus according to claim 1, wherein the apparatus is the handheld device.

13. An apparatus according to claim 1, wherein the apparatus is a mobile telephone.

14. A method comprising:
   receiving force from mutual movement between two mutually moveable body parts of a handheld device and correspondingly causing mutual rotational movement between a first fluid shear member and a second fluid shear member;
   shearing viscous fluid between the first fluid shear member and the second fluid shear member in a plurality of coaxial layers, the layers being axially overlapping,
   wherein shearing the viscous fluid comprises the first fluid shear member comprising a first cylindrical element, the second fluid shear member comprising a second cylindrical element, the first fluid shear member further comprising a third cylindrical element coaxially with and inside the first cylindrical element, wherein the first and third cylindrical elements sandwich the second cylindrical element therebetween and shearing of the viscous fluid occurs directly between the first cylindrical element and the second cylindrical element, and directly between the second cylindrical element and the third cylindrical element.

15. An apparatus comprising:
   in a mutually rotatable configuration, first fluid shear means connectable to first moveable body part means of a handheld device and second fluid shear means connectable to second moveable body part means of the handheld device, the first and second fluid shear means being configured to experience mutual rotation when the first and second moveable body part means are connected respectively to the first and second fluid shear means and when the moveable body part means are moved in relation to one another;
   the first and second fluid shear means being matched; and
   fluid between the first and second fluid shear means,
   wherein the first fluid shear means comprises a first cylindrical element,
   wherein the second fluid shear means comprises a second cylindrical element,
   wherein the first fluid shear means further comprises a third cylindrical element coaxially with and inside the first cylindrical element, and
   wherein the first and third cylindrical elements sandwich the second cylindrical element therebetween.

* * * * *